United States Patent
Nagai et al.

(10) Patent No.: US 10,505,927 B2
(45) Date of Patent: *Dec. 10, 2019

(54) MEMORY DEVICE AND HOST DEVICE

(71) Applicant: TOSHIBA MEMORY CORPORATION, Minato-ku (JP)

(72) Inventors: Koichi Nagai, Tokyo (JP); Yuji Kashiwagi, Odawara (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/204,854

(22) Filed: Nov. 29, 2018

(65) Prior Publication Data

US 2019/0173875 A1    Jun. 6, 2019

Related U.S. Application Data

(63) Continuation of application No. 14/956,802, filed on Dec. 2, 2015, now Pat. No. 10,157,149.

(30) Foreign Application Priority Data

Dec. 2, 2014    (JP) ................ 2014-244075

(51) Int. Cl.
*H04L 29/06* (2006.01)
*G06F 3/06* (2006.01)
(Continued)

(52) U.S. Cl.
CPC ........ *H04L 63/0838* (2013.01); *G06F 1/3275* (2013.01); *G06F 1/3287* (2013.01);
(Continued)

(58) Field of Classification Search
CPC .. G06F 12/1408; G06F 3/0622; G06F 3/0629; G06F 3/0688; G06F 1/3287;
(Continued)

(56) References Cited

U.S. PATENT DOCUMENTS 6,240,517 B1    5/2001    Nishioka
7,689,836 B2 *  3/2010    Nagase ................ G06F 21/602
                                                380/277
(Continued)

FOREIGN PATENT DOCUMENTS

JP    2003-51819    2/2003
JP    2003-92567    3/2003
(Continued)

*Primary Examiner* — Kambiz Zand
*Assistant Examiner* — Benjamin A Kaplan
(74) *Attorney, Agent, or Firm* — Oblon, McClelland, Maier & Neustadt, L.L.P.

(57) ABSTRACT

According to one embodiment, a memory device includes: a nonvolatile semiconductor memory; and a controller which controls the semiconductor memory. The controller includes: a first memory which stores a first key; a second memory which stores a second key; a first generator which generates a third key based on a random number; a second generator which generates a fourth key based on the first key and the third key; and an encryptor which encrypts the second key with the third key. The third key and the encrypted second key are stored in a host device enabled to access the memory device.

20 Claims, 9 Drawing Sheets

(51) Int. Cl.
    *G06F 1/3287*    (2019.01)
    *H04L 9/08*      (2006.01)
    *H04L 9/32*      (2006.01)
    *G06F 1/3234*    (2019.01)
(52) U.S. Cl.
    CPC .......... *G06F 3/0622* (2013.01); *G06F 3/0623* (2013.01); *G06F 3/0658* (2013.01); *G06F 3/0679* (2013.01); *H04L 9/0822* (2013.01); *H04L 9/3228* (2013.01); *H04L 63/0428* (2013.01); *H04L 63/0457* (2013.01); *H04L 63/067* (2013.01); *H04L 63/126* (2013.01); *G06F 2212/1052* (2013.01); *H04L 2463/062* (2013.01); *Y02D 10/13* (2018.01); *Y02D 10/14* (2018.01); *Y02D 10/171* (2018.01)
(58) Field of Classification Search
    CPC .......... G06F 1/3275; G06F 2212/1052; G06F 3/0623; G06F 3/0658; G06F 3/0679; H04L 63/0457; H04L 63/067; H04L 63/0838; H04L 63/0428; H04L 63/126; H04L 9/0822; H04L 9/3228; H04L 2463/062; Y02D 10/13; Y02D 10/14; Y02D 10/171

USPC .................................................. 713/176, 193
See application file for complete search history.

(56)          References Cited

U.S. PATENT DOCUMENTS

| 8,732,466 B2    | 5/2014  | Nagai               |
| 10,122,716 B2 * | 11/2018 | Shaw ............... G06F 21/305 |
| 2003/0033537 A1 | 2/2003  | Fujimoto et al.     |
| 2004/0218214 A1 | 11/2004 | Kihara              |
| 2013/0156195 A1*| 6/2013  | Lee ............... H04L 9/08 |
|                 |         | 380/277             |
| 2013/0185562 A1 | 7/2013  | Kato et al.         |
| 2013/0276131 A1 | 10/2013 | Bjones              |
| 2014/0013062 A1 | 1/2014  | Matsukawa et al.    |
| 2015/0242141 A1 | 8/2015  | Kuo et al.          |
| 2016/0094930 A1 | 3/2016  | Ramanna             |

FOREIGN PATENT DOCUMENTS

| JP | 2013-62616  | 4/2013 |
| JP | 2013-145998 | 7/2013 |
| JP | 2014-16735  | 1/2014 |

* cited by examiner

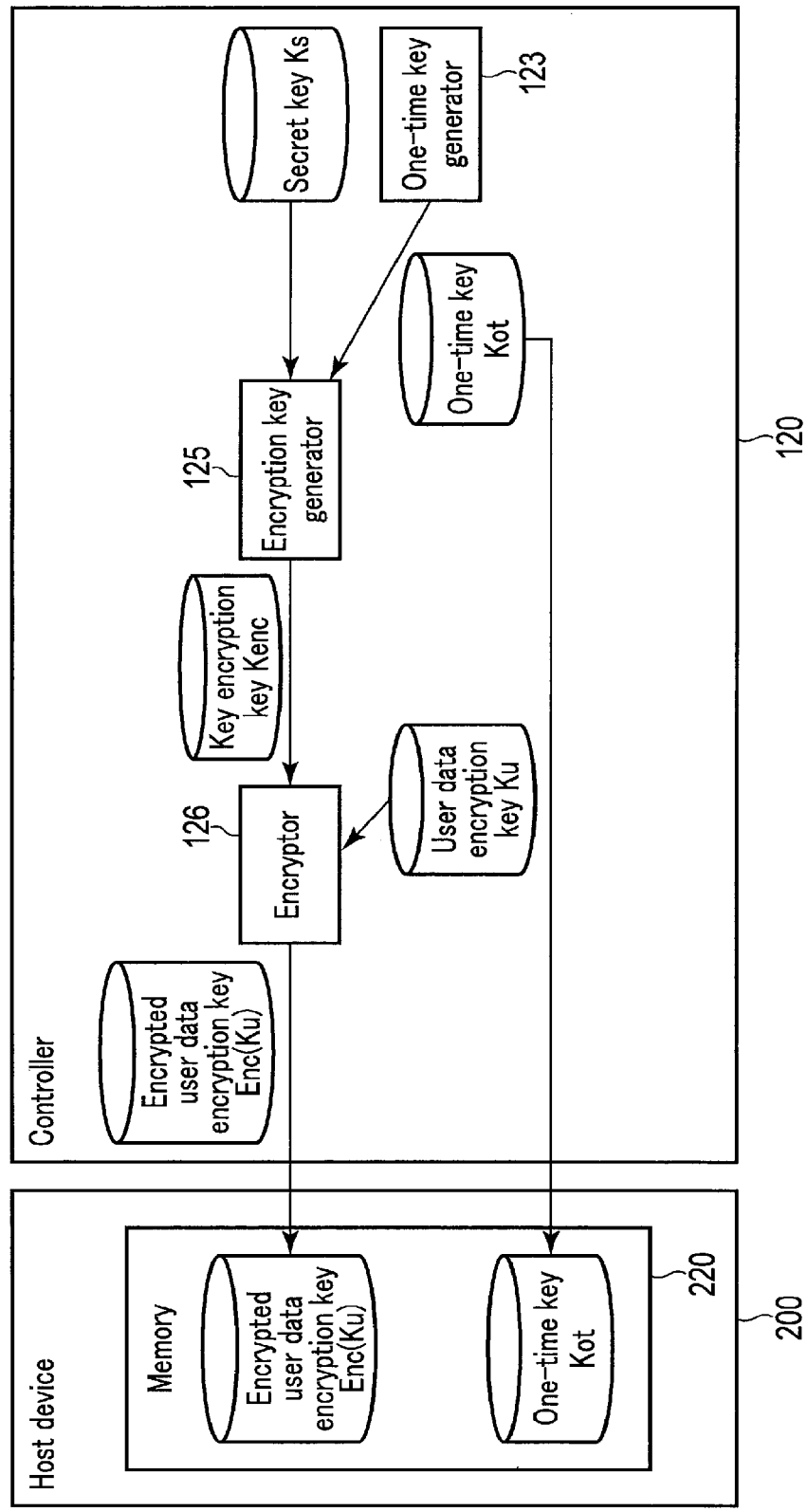
F I G. 3

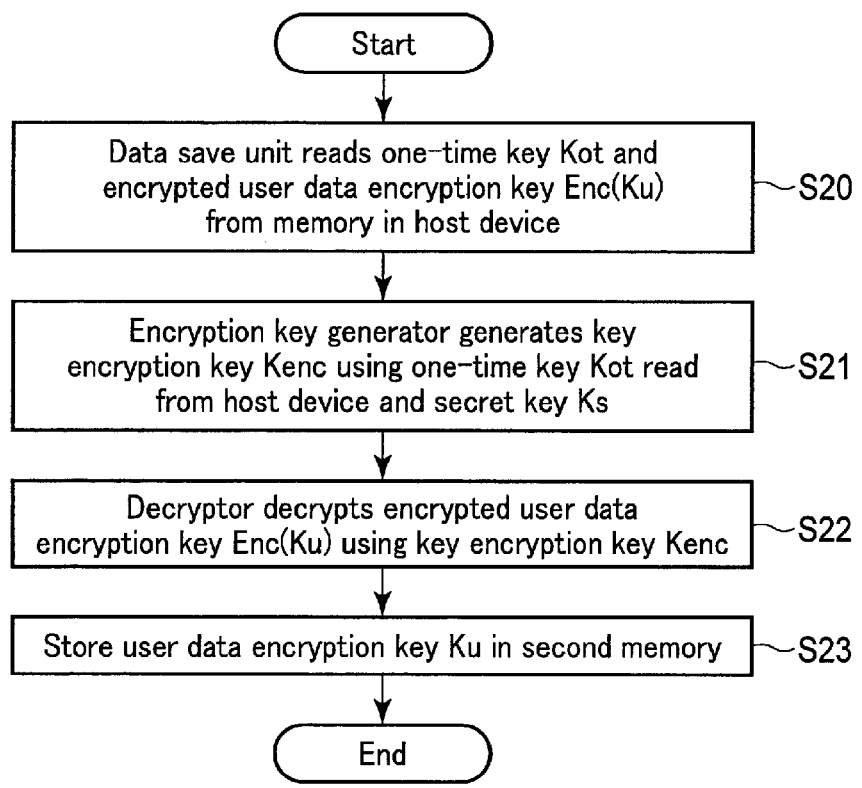
F I G. 4

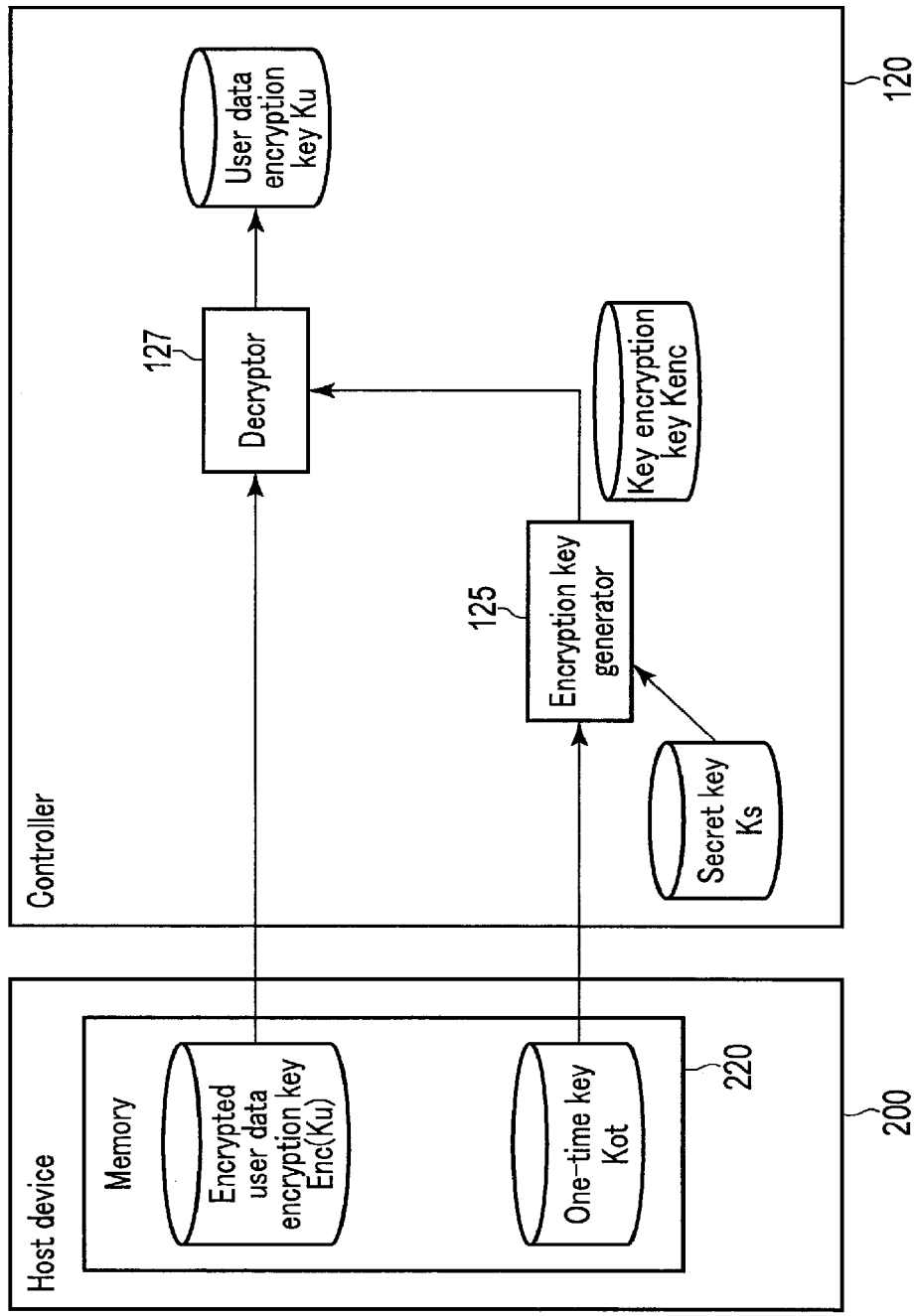
F I G. 5

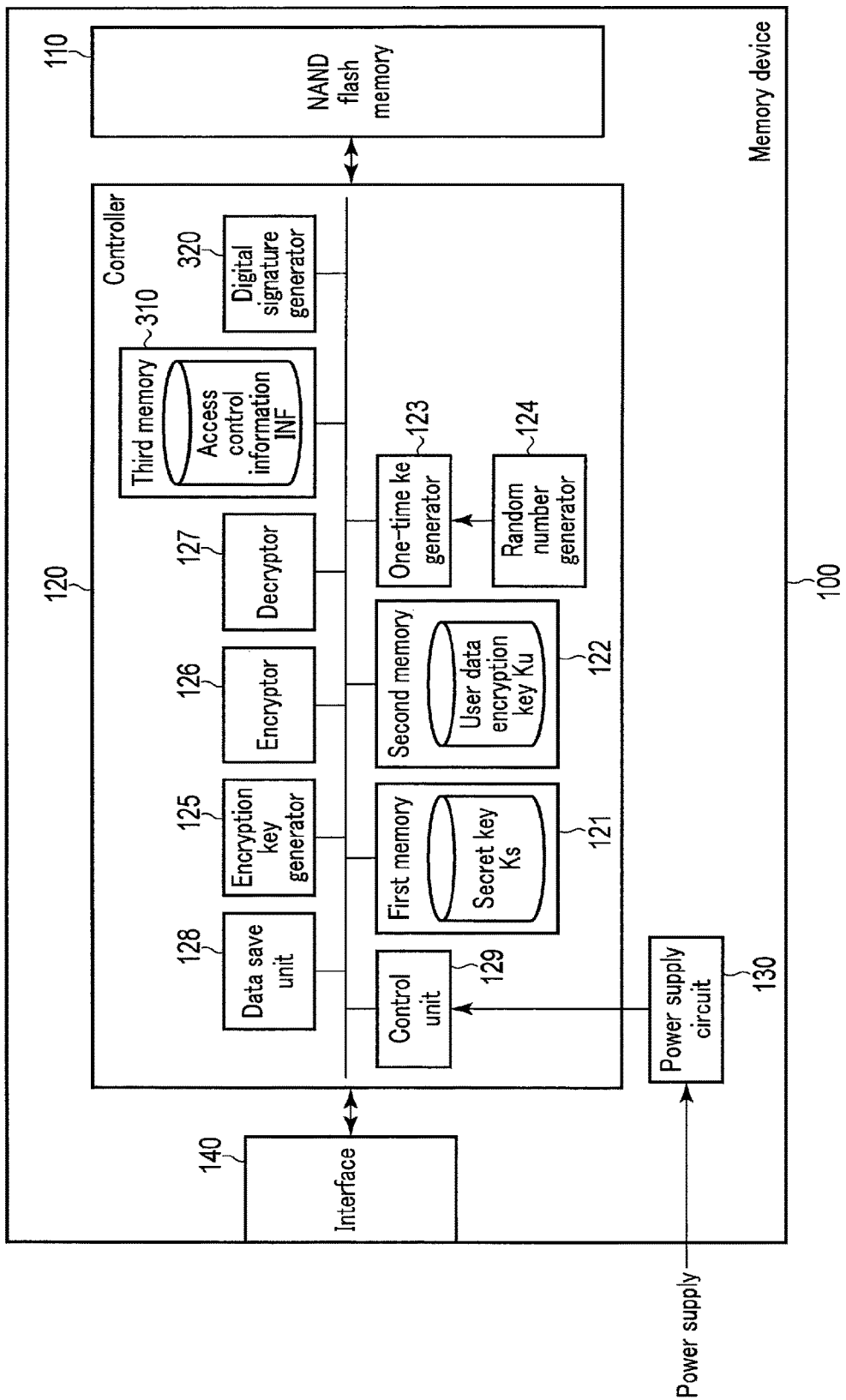
F I G. 9

MEMORY DEVICE AND HOST DEVICE

CROSS-REFERENCE TO RELATED APPLICATIONS

This application is a continuation of U.S. application Ser. No. 14/956,802, filed Dec. 2, 2015, which is based upon and claims the benefit of priority from Japanese Patent Application No. 2014-244075, filed Dec. 2, 2014, the entire contents of which are incorporated herein by reference.

FIELD

Embodiments described herein relate generally to a memory device and a host device.

BACKGROUND

A system is known which executes an authentication process between a memory device and a host device.

BRIEF DESCRIPTION OF THE DRAWINGS

FIG. 3 is a block diagram illustrating operations performed by a memory device when the power supply is turned off according to the first embodiment;

FIG. 4 is a flowchart illustrating operations performed by the controller when the power supply is turned on according to the first embodiment;

FIG. 5 is a block diagram illustrating operations performed by the memory system when the power supply is turned on according to the first embodiment;

FIG. 9 is a block diagram of a memory device according to a modification of the second embodiment.

DETAILED DESCRIPTION

In general, according to one embodiment, a memory device includes a nonvolatile semiconductor memory and a controller which controls the semiconductor memory. The controller includes a first memory which stores a first key, a second memory which stores a second key, a first generator which generates a third key based on a random number, a second generator which generates a fourth key based on the first key and the third key, and an encryptor which encrypts the second key with the fourth key. The third key and the encrypted second key are stored in a host device enabled to access the memory device.

1. First Embodiment

A memory device and a host device according to a first embodiment will be described.

1.1 Configuration of the Memory System

Figure 1:
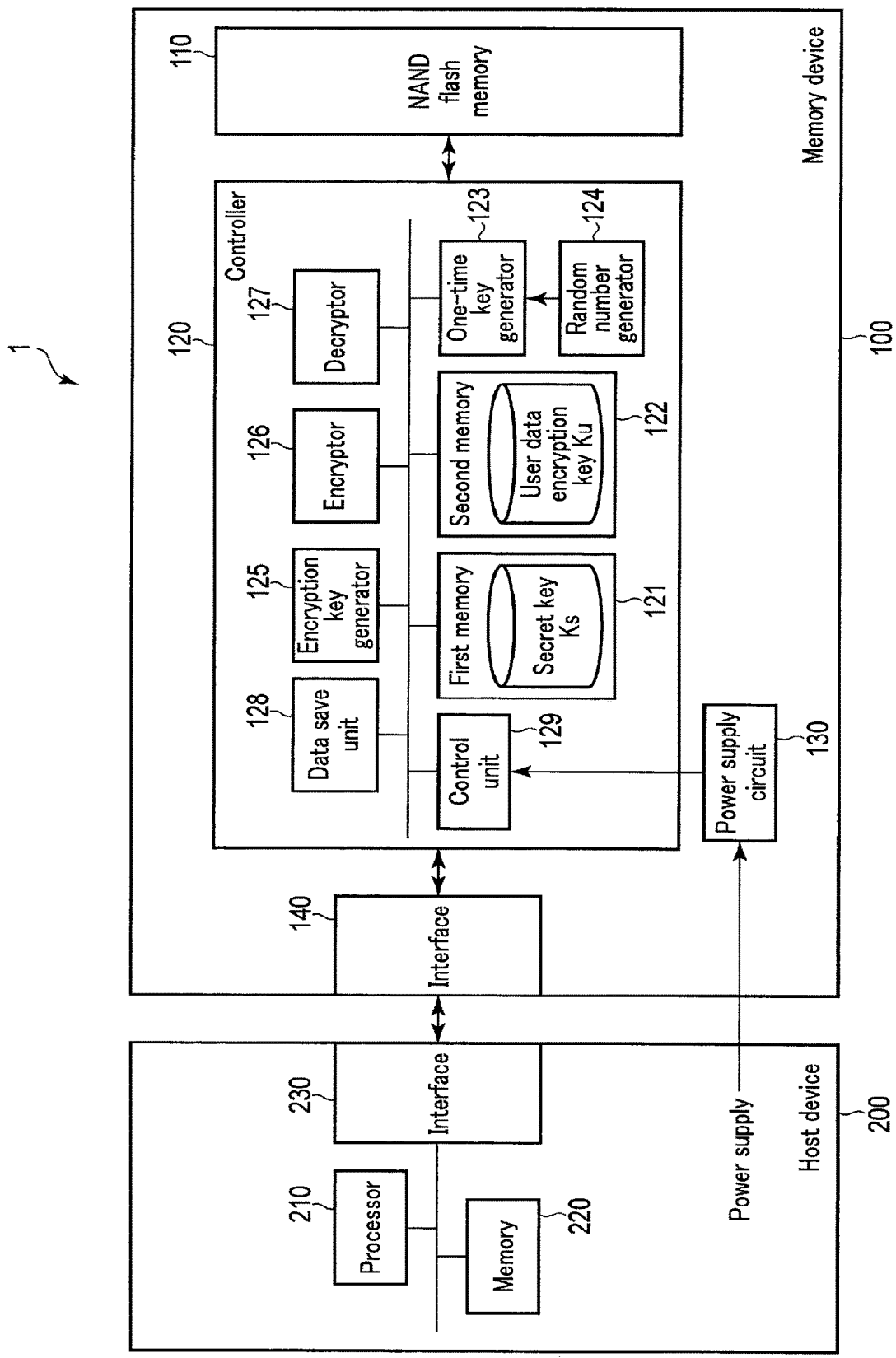
FIG. 1 is a block diagram of a memory system according to a first embodiment.

First, a configuration of a memory system to which the memory device according to the present embodiment is applied will be described using FIG. 1. As depicted in FIG. 1, a memory system 1 includes a memory device 100 and a host device 200.

The host device 200 uses the memory device 100 and is, for example, a personal computer. Alternatively, the host device 200 may be a portable digital assistant such as a smartphone.

The memory device 100 includes a non-volatile semiconductor memory, and is, for example, an SSD (Solid State Drive). Alternatively, the memory device 100 may be, for example, a memory card such as an SD™ card, a multimedia card such as an eMMC™, or a memory module compliant with the UFS (Universal Flash Storage) standard.

The host device 200 and the memory device 100 will be described below in detail.

1.1.1 Configuration of the Host Device

First, a configuration of the host device 200 will be described with continued reference to FIG. 1. As depicted in FIG. 1, the host device 200 includes, for example, a processor 210, a memory 220, and an interface 230 that are connected together via a bus so as to be able to communicate with one another.

The processor 210 is, for example, a CPU and controls operations of the host device 200 as a whole by executing firmware. The processor 210 can read data from the memory device 100 by issuing a command for access to the memory device 100, execute a process using the data, and further write the data to the memory device 100.

The memory 220 may be, for example, a volatile memory such as a DRAM or an SRAM, a nonvolatile memory such as a flash memory, or a combination thereof. The memory 220 functions as a work area for the processor 210 and stores key information generated by the memory device 100 (this will be described below). An area where the key information is stored is preferably an area in a volatile memory in terms of security because the key information is lost when a host system is powered off.

The interface 230 controls communication with the memory device 100.

1.1.2 Configuration of the Memory Device

Now, a configuration of the memory device 100 will be described with continued reference to FIG. 1. As depicted in FIG. 1, the memory device 100 generally includes a NAND flash memory 110, a controller 120, a power supply circuit 130, and an interface 140.

The NAND flash memory 110 stores user data provided by the host device 200, a control program to be executed to allow the controller 120 to operate, and the like. In the present example, the NAND flash memory 110 is described by way of example. However, the NAND flash memory 110 may be replaced with another nonvolatile semiconductor memory. Alternatively, besides the semiconductor memory, a storage apparatus such as a hard disk may replace the NAND flash memory 110.

The controller 120 operates by executing the control program in the flash memory 110, and controls operations of the memory device 100 as a whole. In accordance with commands received from the host device 200, the controller 120 reads data from the flash memory 110, or writes data to the flash memory 110, or erases data from the flash memory 110. The controller will be described below in detail.

The power supply circuit 130 is externally supplied with power to generate a plurality of internal power voltages based on the external power supply. The power supply circuit 130 supplies the generated internal power voltages to the controller 120, the NAND flash memory 110, and the interface 140. The power supply circuit 130 also detects that the external power supply has been provided to deliver, to the controller 120, a signal notifying the controller 120 that the external power supply has been provided (for example, a power-on reset signal: POR signal). When the external power supply is turned off, the power supply circuit 130 also delivers, to the controller 120, a signal notifying the controller 120 that the external power supply is turned off. The external power supply is provided by, for example, the host device 200, and such a case will be described below.

The interface 140 controls communication with the host device 200. A communication interface between the memory device 100 and the host device 200 may be compliant with, for example, PCI (Peripheral Component Interconnect) or PCI Express.

FIG. 1 depicts the power supply circuit 130 and the interface 140 as components different from the controller 120. However, at least one of the power supply circuit 130 and the interface 140 may be a part of the controller 120.

1.1.3 Details of the Controller 120

Now, a configuration of the controller 120 will be described in detail with continued reference to FIG. 1. As depicted in FIG. 1, the controller 120 includes a first memory 121, a second memory 122, a one-time key generator 123, a random number generator 124, an encryption key generator 125, an encryptor 126, a decryptor 127, a data save unit 128, and a control unit 129. These components may be implemented by the processor executing software, or as a physical electronic circuit, or using a combination of the execution of the software and the provision of the physical electronic circuit.

The first memory 121 is a nonvolatile memory, for example, a semiconductor memory such as a flash memory 110, or a fuse element. The first memory 121 stores a secret key Ks inherent in the memory device 100. The secret key Ks is written to the first memory 121, for example, when the memory device 100 is manufactured, such that the secret key Ks is inhibited from being accessed from outside the memory device 100.

The second memory 122 is a volatile memory, for example, a semiconductor memory such as a DRAM. The second memory 122 stores a user data encryption key Ku. The user data encryption key Ku is used to encrypt data transmitted from the host device 200. The encrypted data is written to the flash memory 110. The user data encryption key Ku is also used to decrypt the encrypted data read from the flash memory 110. The decrypted data is transmitted to the host device 200.

The random number generator 124 generates a random number.

The one-time key generator 123 generates a one-time key Kot based on the random number generated by the random number generator 124. The one-time key Kot is allowed to be used only once and is also referred to as a one-time pad or a one-time password. The one-time key generator 123 generates a different one-time key Kot, for example, each time the power supply to the controller 120 is turned off.

The encryption key generator 125 generates a key encryption key Kenc using the secret key Ks in the first memory 121, and the one-time key Kot generated by the one-time key generator 123. The key encryption key Kenc is used to encrypt the user data encryption key Ku and to decrypt the encrypted user data encryption key.

The encryptor 126 encrypts the user data encryption key Ku using the key encryption key Kenc. The encrypted user data encryption key is hereinafter represented as Enc(Ku).

The decryptor 127 decrypts the encrypted user data encryption key Enc(Ku) using the key encryption key Kenc to obtain the plain user data encryption key Ku.

The data save unit 128 transmits the one-time key Kot and the encrypted user data encryption key Enc(Ku) to the host device 200 to allow the host device 200 to save the keys to the memory 220 when the power supply to the controller 120 is turned off. The data save unit 128 reads the one-time key Kot and the encrypted user data encryption key Enc(Ku) from the memory 220 when the power supply to the controller 120 is turned on.

The control unit 129 controls operations of the above-described blocks. The control unit 129 can detect the turning-on or off of the power supply to or from the controller 120 by, for example, receiving a signal from the power supply circuit 130. Alternatively, an instruction to prepare for turning off the power supply can be received from the host device 200 (for example, the processor 210 in the host device 200). An example will be described below where a notification for preparation for turning off the power supply is received from the host device 200.

1.2 Operations of the Memory System 1

Now, operations of the memory system 1 configured as described above will be described.

1.2.1 Operations Performed at the Turning Off Power Supply

First, operations performed when the power supply to the controller 120 is turned off will be described.

The power supply to the power supply circuit 130 in the controller 120 is provided by the host device 200 as described above. A relevant power supply switch is also in the host device 200 and is controlled by the processor 210. When the power supply to the controller 120 is turned off, the processor 210 transmits information indicating that the power supply is to be turned off, for example, to the control unit 129 in the controller 120. Upon receiving the information, the control unit 129 controls the functional blocks to allow the host device 200 to save the one-time key Kot and the encrypted user data encryption key Enc(Ku).

Figure 2:
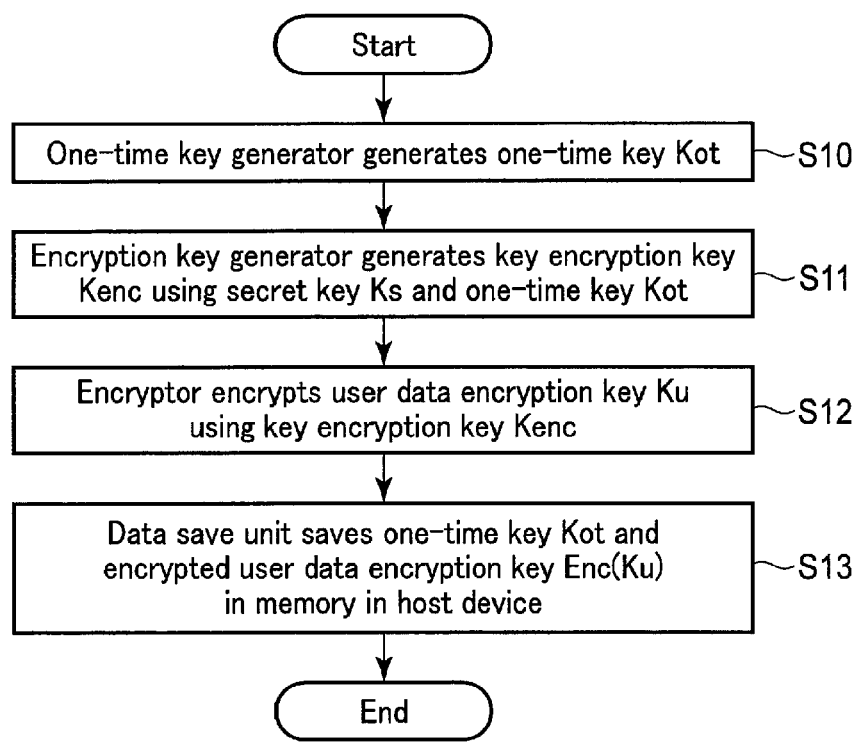
FIG. 2 is a flowchart illustrating operations performed by a controller when a power supply is turned off according to the first embodiment.

That is, as illustrated in FIG. 2 and FIG. 3, first, the one-time key generator 123 generates the one-time key Kot (step S10). Then, the encryption key generator 125 generates the key encryption key Kenc using the secret key Ks read from the first memory 121 and the one-time key Kot generated in step S10 (step S11).

The encryptor 126 subsequently uses the key encryption key Kenc generated in step S11 to encrypt the user data encryption key Ku read from the second memory 122 to obtain the encrypted user data encryption key Enc(Ku) (step S12).

Then, the data save unit 128 transmits the one-time key Kot generated in step S10 and encrypted user data encryption key Enc(Ku) generated in step S12 to the host device 200 (step S13). The keys Kot and Enc(Ku) are stored in the memory 220 in the host device 200.

When the needed data is saved to the host device 200 as described above and the controller 120 completes preparation for power shutdown, the control unit 129 notifies the processor 210 in the host device of the saving and the completion of the preparation. Upon receiving this notification, the processor 210 turns off the power supply to the controller 120. As a result, the user data encryption key Ku in the volatile second memory is lost. The secret key Ks is stored in the nonvolatile first memory and prevented from being lost.

Any of various methods may be used as a mechanism for the notification of completion of the power shutdown preparation, according to an implementation. For example, the host device 200 may monitor a flag (that is indicative of the completion of the preparation) present in a register on the interface 140, to confirm the completion of the power shutdown preparation. Alternatively, the host device 200 may issue a command to instruct the controller 120 to prepare for the power shutdown. In this case, whether or not the memory device 100 has completed the preparation for the power shutdown can be determined depending on whether or not the command has ended normally.

1.2.2 Operations at the Time of Turning on Power Supply

Now, operations performed when the power supply is turned on to the controller 120 will be described.

For example, when the host device 200 turns on the power supply to the controller 120, the power supply circuit 130 transmits information indicating that the power supply to the controller 120 has been turned on (POR signal) to the control unit 129. Upon receiving the information, the control unit 129 controls the functional blocks to read the one-time key Kot and the encrypted user data encryption key Enc(Ku) from the host device 200 to obtain the plain user data encryption key Ku.

That is, as illustrated in FIG. 4 and FIG. 5, first, the data save unit 128 reads the one-time key Kot and the encrypted user data encryption key Enc(Ku) saved in the host device 200, using the method described with reference to FIG. 2 and FIG. 3 (step S20).

Then, the encryption key generator 125 generates the key encryption key Kenc using the secret key Ks read from the first memory 121 and the one-time key Kot read in step S20 (step S21).

The decryptor 127 subsequently uses the key encryption key Kenc generated in step S21 to decrypt the user data encryption key Ku read in step S20 to obtain the plain user data encryption key Ku (step S22).

The user data encryption key Ku obtained in step S22 is stored in the second memory 122. Subsequently, the user data is encrypted using the user data encryption key Ku, and the encrypted user data is stored in the semiconductor memory 110. The user data encryption key Ku is also used to decrypt the encrypted data read from the semiconductor memory 110.

1.3 Effects According to the Present Embodiment

The present embodiment can make the operations of the memory device more reliable. This effect will be described below.

A system is known which performs authentication between a host computer and an external storage apparatus in order to protect contents and to prevent data leakage. In such a system, when the power supply to the external storage apparatus is turned off during operation of the host computer, the authentication needs to be performed again at the time of turning on the power supply. This authentication operation is performed, for example, by the user inputting an authentication key via the host computer. Alternatively, the need for the user's input may be eliminated by performing automatic authentication using the authentication key pre-stored on the host computer.

For example, for a storage apparatus used for mobile device (for example, an SSD), the rate of the duration for which the storage apparatus is actually used (accessed) is, for example, at most 2%. Therefore, in the mobile device, the power supply to the storage apparatus is desirably frequently turned off in order to reduce power consumption.

However, the authentication process needs a certain amount of time, thus consuming power for each authentication. In particular, a long time is needed for the user to input the authentication key. In other words, even though the power supply is turned off in order to reduce power consumption, the authentication process needed as a result of the power saving may prevent a sufficient power consumption reduction effect from being achieved. Moreover, the user needs to input the authentication key for each power supply connection to the storage apparatus for which the power supply is automatically turned off in order to reduce power, and this is very cumbersome and inconvenient.

When the authentication key is stored in the host computer, spoofing fails to be prevented if the authentication key is revealed through an attack on the host computer. In other words, preventing unauthorized access to the storage apparatus is difficult. Therefore, the host computer needs to take very advanced protection measures for the authentication key.

In this regard, the configuration according to the present embodiment eliminates the need for the authentication process at the time of returning on the power supply. That is, in the present embodiment, the user data encryption key Ku is encrypted, and the encrypted user data encryption key Enc(Ku) and the one-time key Kot used for encryption are saved to the host device 200 as described with reference to FIG. 3. When the power supply is turned on, the memory device 100 reads the keys Enc(Ku) and Kot from the host device, and the user data encryption key Ku is subsequently generated inside the memory device 100.

Since the need for the authentication process is thus eliminated, the power consumption can be effectively reduced even with frequent power-on and -off operations. Furthermore, since the need for the authentication process is thus eliminated, the memory device 100 quickly becomes available after the power supply is turned on, enabling the memory system to achieve quick responses.

The present embodiment further eliminates the need for the authentication process between the memory device 100 and the host device 200 and thus the need for the host device 200 to store the authentication key. Therefore, the host device 200 need not take advanced protection measures for data.

Even if the encrypted user data encryption key Enc(Ku) in the host device 200 is revealed, the plain user data encryption key Ku fails to be obtained unless the secret key Ks in the memory device 100 leaks. Even if not only the encrypted user data encryption key Enc(Ku) but also the one-time key Kot is revealed, the plain user data encryption key Ku fails to be obtained also unless the secret key Ks is leaked.

As described above, unauthorized access such as spoofing can be suppressed without the need for the host device to take advanced information leakage measures.

In the present embodiment, the encrypted user data encryption key Enc(Ku) is not stored in the memory device 100 but in the host device 200. When the power supply is turned on, the key Enc(Ku) is read from the memory 220 and decrypted to obtain the user data encryption key Ku. In other words, the encrypted user data encryption key Enc(Ku) need not be held by the controller 120 for the memory device 100. This enables a reduction in a memory capacity needed for the controller 120 and contributes to miniaturization of the controller 120.

The one-time key Kot may be saved in the memory device 100. In this case, the one-time key Kot may be stored in the semiconductor memory 110, or for example, in the nonvolatile memory in the controller 120. When the one-time key Kot is saved in the memory device 100, the one-time key Kot need not necessarily be saved to the host device 200 when the power supply is turned off.

The generation of the one-time key Kot by the one-time key generator 123 may be performed at the time of turning on the power supply or during normal operation rather than at the time of turning off the power supply. In this case, the generated one-time key Kot may be stored, for example, in the semiconductor memory 110. Then, the one-time key Kot may be read from the semiconductor memory 110 at the time of turning off the power supply.

Figure 6:
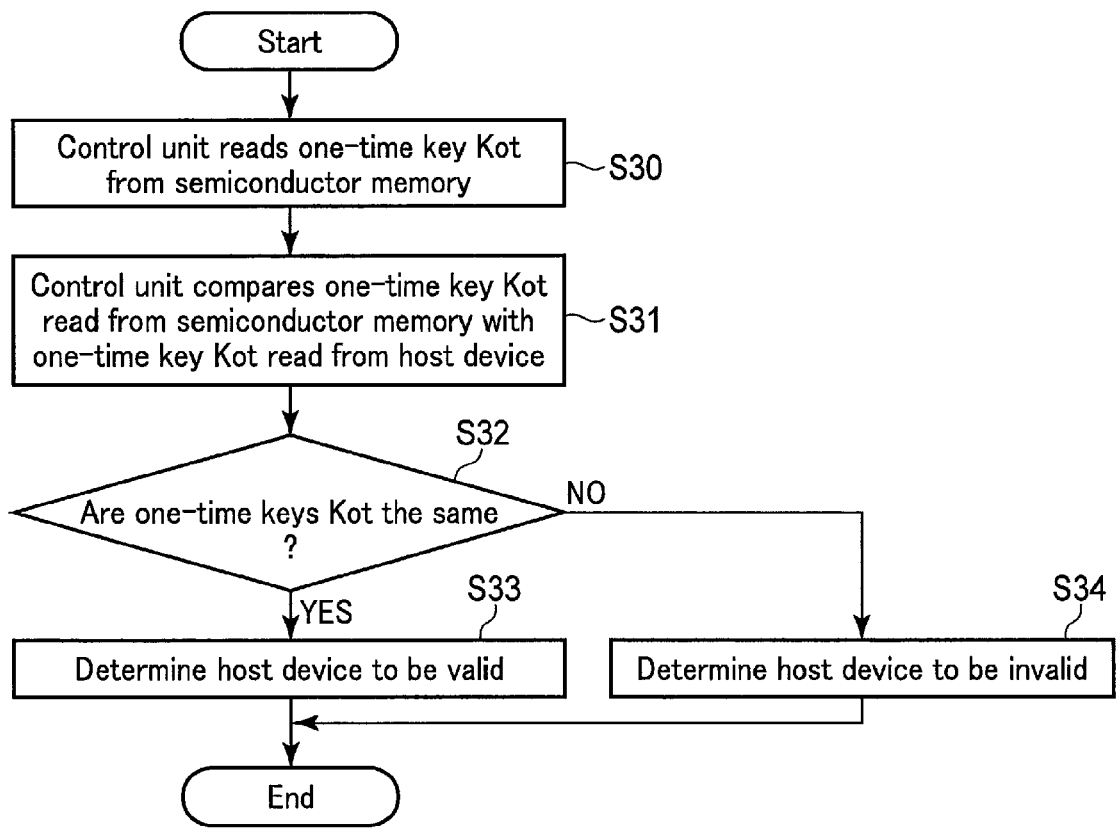
FIG. 6 is a flowchart illustrating operations performed by the controller when the power supply is turned on according to a modification of the first embodiment.

When stored both in the semiconductor memory 110 and in the host device 200, the one-time key Kot may be used to determine validity of the host device 200. Such an example is illustrated in FIG. 6. FIG. 6 illustrates operations performed by the controller 120 when the power supply is turned on. The operations may be performed after step S20 described with reference to FIG. 4 and in parallel with steps S21 to 23, or before or after steps S21 to S23.

As illustrated, for example, the control unit 129 reads the one-time key Kot stored in the semiconductor memory 110 when the power supply is turned off (step S30). The control unit 129 then compares the one-time key Kot read in step S31 with the one-time key Kot read from the host device 200 in step S20 in FIG. 4 (step S31).

When the two one-time keys Kot are the same (step S32, YES), the control unit 129 determines the host device 200 to be valid (step S33). That is, when the other needed processes are completed, the host device 200 can access the semiconductor memory 110.

On the other hand, when the two one-time keys Kot are not the same, the control unit 129 determines the host device 200 not to be valid (step S34). Therefore, the control unit 129 inhibits the host device 200 from accessing the semiconductor memory 110.

The present method allows the memory device 100 to be more effectively protected. That is, in general, after the power supply is turned on to the controller 120, the controller 120 is first allowed to read data from the semiconductor memory 110 and then allowed to read data from the semiconductor memory 110. Thus, the controller 120 first loads data on the memory 220 in the host device 200, and based on the information (Enc(Ku), Kot, and firmware) in the data, prepares the memory device 100 for operations. Subsequently, upon being allowed to access the semiconductor memory 110, the controller 120 reads the one-time key Kot from the semiconductor memory 110. When the one-time keys Kot are the same, the controller 120 continues the process. When the one-time keys Kot are not the same, the controller 120 determines that the access is being made by an unauthorized host device to suspend the operation.

This method also allows the memory device 100 to be protected. Of course, when stored in the host device 200 and/or the semiconductor memory 110, the one-time key Kot may be encrypted using a certain key (for example, the secret key Ks). In this case, when the power supply is turned on, the secret key Ks may be used to decrypt the encrypted one-time key Kot.

2. Second Embodiment

Now, a memory device and a host device according to a second embodiment will be described. The present embodiment represents the first embodiment in which not only the encrypted user data Enc(Ku) and the one-time key Kot but also access control information INF is saved to the host device 200 when the power supply is turned off. Only differences from the first embodiment will be described below.

2.1 Configuration of the Memory Device

Figure 7:
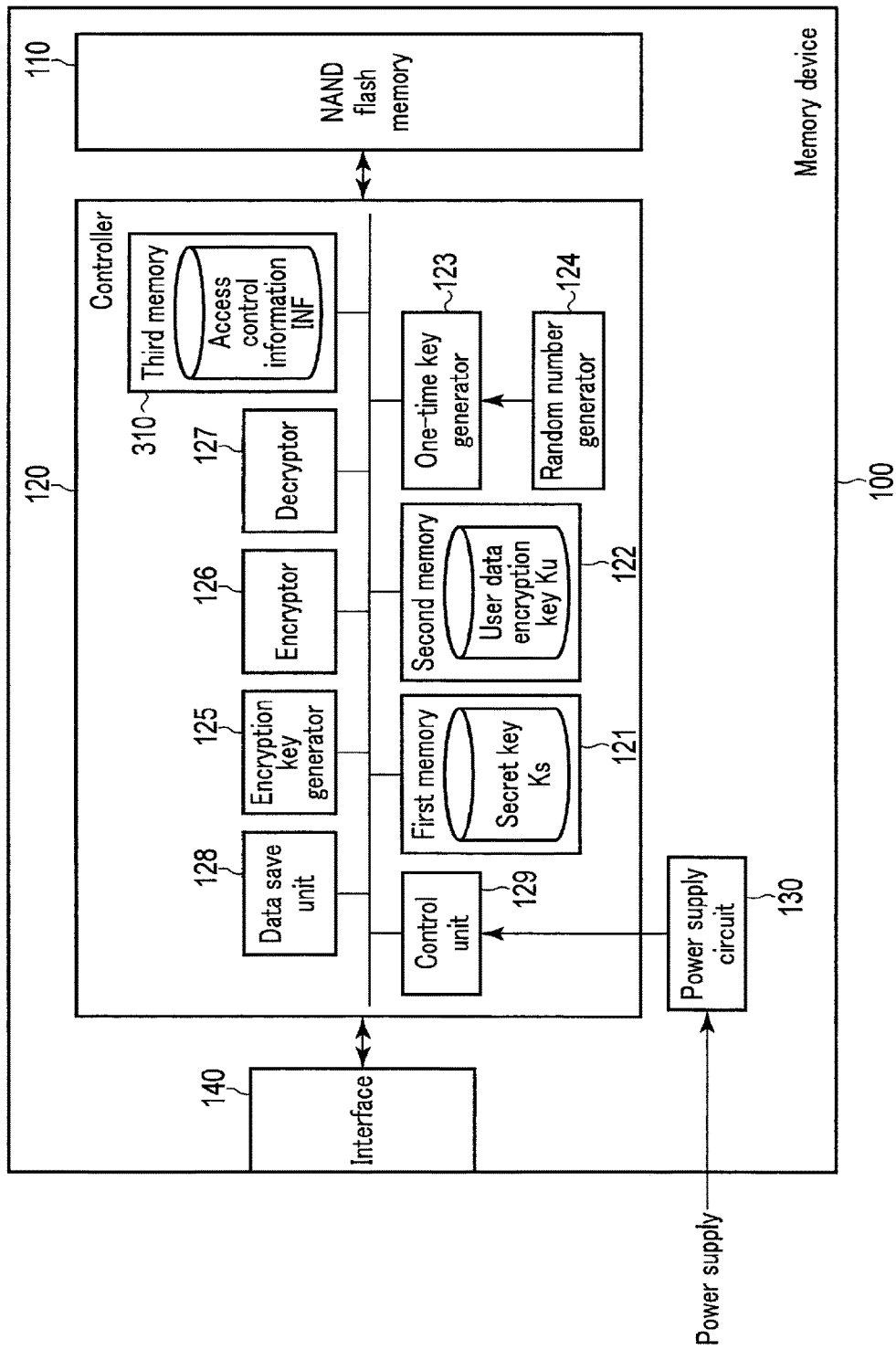
FIG. 7 is a block diagram of a memory device according to a second embodiment.

A configuration of the memory device 100 according to the present embodiment will be described using FIG. 7. As depicted in FIG. 7, the memory device 100 according to the present embodiment has the configuration in FIG. 1 described in the first embodiment and in which the controller 120 further includes a third memory 310.

The third memory is, for example, a volatile memory and stores the access control information INF. The access control information INF is information indicating whether or not to permit access to the entire semiconductor memory 110 or a particular area thereof. The access control information INF may be information indicating whether or not to permit access for each of data read, write, and erase. When access control is performed for each of a plurality of users, the access control information INF is provided for each user.

2.2 Operations of the Memory System 1

Now, operations of the memory system 1 according to the present embodiment will be described.

2.2.1 Operations at the Time of Turning Off the Power Supply

Figure 8:
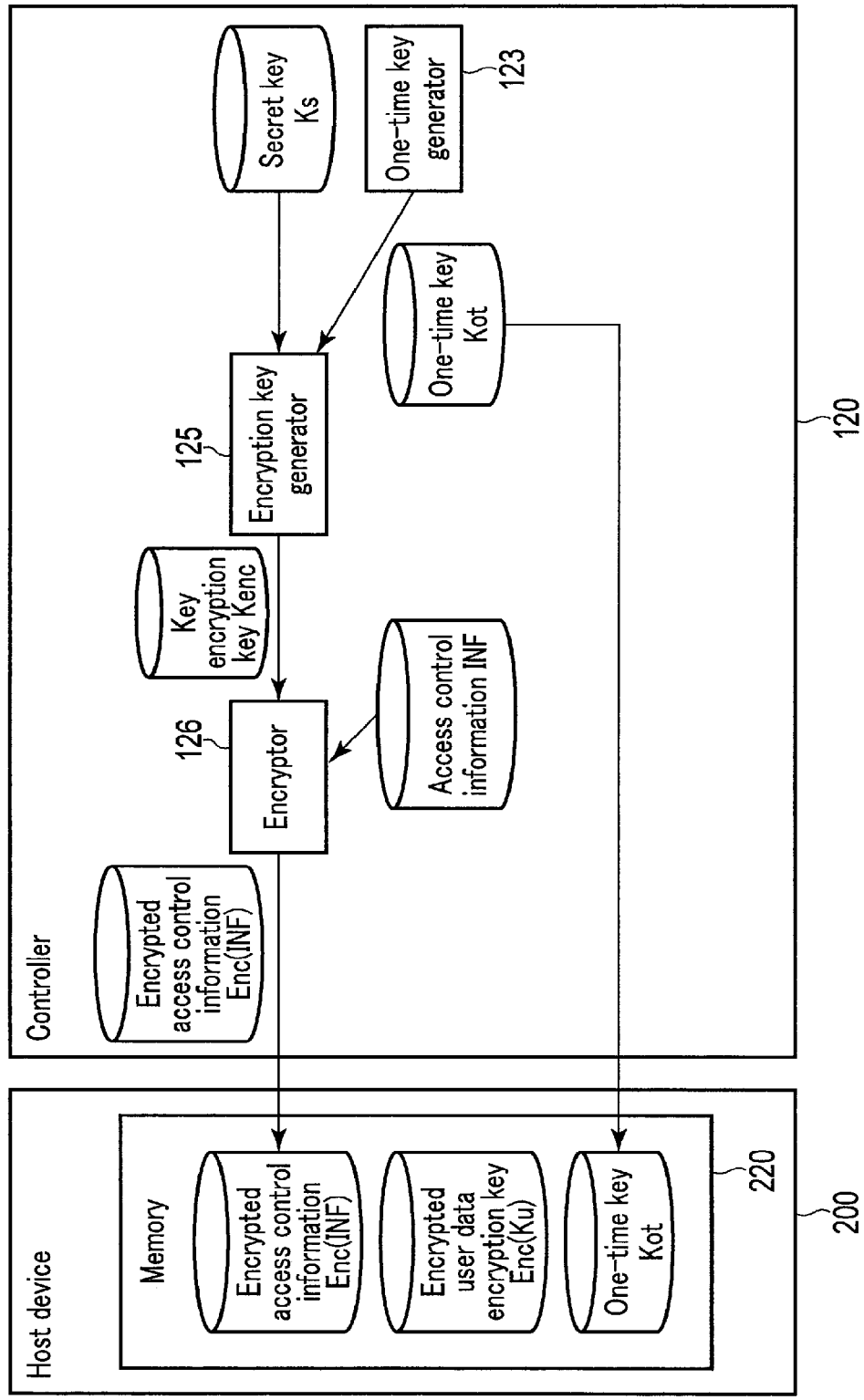
FIG. 8 is a block diagram illustrating operations performed by the memory device when the power supply is turned off according to the second embodiment.

First, operations performed when the power supply to the controller 120 is turned off will be described using FIG. 8. FIG. 8 illustrates only a process executed on the access control information INF. A process executed on the user data encryption key Ku is similar to the process executed on the user data encryption key Ku in the first embodiment. Differences of the present embodiment from the first embodiment described with reference to FIG. 2 and FIG. 3 are as follows.

(1) After step S11, the encryptor 126 encrypts the access control information INF using the key encryption key Kenc generated in step S11, to obtain encrypted access control information Enc(INF).

(2) Subsequently, the data save unit 128 stores the encrypted access control information Enc(INF) in the memory 220 in the host device 200. Then, the power supply is turned off.

2.2.2 Operations at the Time of Turning on the Power Supply

Now, operations performed when the power supply is turned on to the controller 120 will be described. Differences of the present embodiment from the first embodiment described with reference to FIG. 4 and FIG. 5 are as follows.

(1) In parallel with the processes in steps S20 and S21 in FIG. 4 or before or after steps S20 and S21, the data save unit 128 reads the encrypted access control information Enc(INF) from the memory 220 in the host device 200. After step S21, the decryptor 127 decrypts the Enc(INF) using the key encryption key Kenc to obtain the plain access control information INF.

(2) Subsequently, the access control information INF is stored in the third memory 310. Subsequent accesses to the semiconductor memory 110 are controlled by the control unit 129 based on the access control information INF.

2.2.3 Effects According to the Present Embodiment

The present embodiment allows effective suppression of leakage of the access control information INF, which includes an access condition for the semiconductor memory 110. Therefore, the data in the semiconductor memory 110 can be more strictly protected.

The access control information INF need not necessarily be encrypted but may be saved to the host device 200 while remaining plain. In this case, the data save unit 128 reads the access control information INF from the third memory 310 and writes the access control information INF to the memory 220 in the host device 200.

A digital signature may be attached to the access control information INF regardless of whether or not the access control information INF is encrypted. FIG. 9 depicts a configuration of the memory device 100 in this case. As depicted in FIG. 9, the controller 120 includes a digital signature generator 320. When the power supply is turned off, the digital signature generator 320 reads the access control information INF from the third memory 310 to generate a digital signature. The digital signature generator 320 then attaches the digital signature to the access control information INF. Subsequently, the data save unit 128 saves the access control information INF with the digital signature attached thereto, to the host device 200. Of course, the access control information INF with the digital signature attached thereto may be encrypted in the encryptor 126.

3. Modifications

As described above, the memory device 100 includes a nonvolatile memory (110 in FIG. 1) and a controller (120 in FIG. 1) which controls the semiconductor memory. The controller 120 includes a first memory (121 in FIG. 1), a second memory (122 in FIG. 1), a first generator (123 in FIG. 1), a second generator (125 in FIG. 1), and an encryptor (126 in FIG. 1). The first memory 121 stores a first key (secret key Ks in FIG. 1). The second memory 122 stores a second key (user data encryption key Ku in FIG. 1). The first generator 123 generates a third key (one-time key Kot in FIG. 3) based on a random number. The second generator 125 generates a fourth key (key encryption key Kenc in FIG. 3) based on the first key Ks and the third key Kot. The encryptor 126 encrypts the second key Ku with the fourth key Kenc. The third key Kot and the encrypted second key Enc(Ku) are stored in a host device enabled to access the memory device.

The present configuration eliminates the need for an authentication process when the power supply is returned on. Thus, with the convenience of the user prevented from being deteriorated, quick responses can be achieved regardless of frequently repeated power-on and -off of the controller, allowing power consumption to be kept low. Moreover, information on the security of the user is protected by the controller before being stored in the host device. Therefore, even if the security of the host device is low, this can be restrained from affecting the security of the memory device. As a result, the operation of the memory device can be made more reliable.

The embodiments are not limited to the above-described examples, but various modifications may be made to the embodiments. Furthermore, the embodiments may be combined together or independently implemented as needed. For example, the second embodiment may be implemented independently of the first embodiment.

The processes described with reference to the flowchart can be interchanged with one another wherever possible. Moreover, for example, some of the processes executed when the power supply is turned off as described with reference to FIG. 2 may be carried out before reception of information indicating the power supply is to be turned off. For example, steps S10 to S12 in FIG. 2 may be executed before the reception of the information, and when the information is received, the saving process in step S13 may be exclusively executed. This also applies to the second embodiment. For example, the encryption of the access control information INF may be performed during normal operation rather than when the power supply is turned off.

Moreover, an error detecting code (EDC) may be added to the access control information INF. The error detecting code is a redundant code added to data in order to allow errors to be detected. The error detecting code may be attached to the data, which may then be encrypted before being saved to the host device. Of course, a digital signature may also be attached to the data.

The functional blocks of the above-described embodiments may be implemented using hardware such as circuits or software executed by the processor. The terms "connect" and "couple" may mean direct connection of objects, connection of the objects via something, or wired or wireless connection of the objects.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory device connectable to a host device, the memory device comprising:
a nonvolatile semiconductor memory; and
a controller which controls the semiconductor memory, wherein the controller includes:
a first memory which stores a first key, the first memory being a nonvolatile memory;
a second memory which stores a second key, the second memory being a volatile memory;
a first generator which generates a third key based on a random number;
a second generator which generates a fourth key based on the first key and the third key; and
an encryptor which encrypts the second key with the fourth key, wherein
the controller transmits the third key and the encrypted second key to the host device in response to first information sent from the host device, the first information indicating that a power supply to the memory device is to be turned off.

2. The memory device according to claim 1, wherein the transmitted third key and the transmitted encrypted second key are stored in the host device.

3. The memory device according to claim 1, wherein the controller further includes a decryptor,
the second generator generates the fourth key based on the first key and the third key read from the host device, and
the decryptor decrypts the encrypted second key read from the host device based on the fourth key.

4. The memory device according to claim 3, wherein, when the power supply to the memory device is turned on, the decryptor decrypts the encrypted second key read from the host device.

5. The memory device according to claim 1, wherein the third key is stored in the semiconductor memory.

6. The memory device according to claim 5, wherein, when the power supply to the memory device is turned on, the third key read from the host device is compared with the third key read from the semiconductor memory.

7. The memory device according to claim 1, wherein the controller further includes a third memory which stores access information on the semiconductor memory, and the access information is transmitted to the host device before the power supply to the memory device is turned off.

8. The memory device according to claim 7, wherein the access information is encrypted by the encryptor, and the encrypted access information is stored in the host device.

9. The memory device according to claim 7, wherein the controller further includes a third generator which generates a digital signature, the digital signature is attached to the access information, and the access information with the digital signature attached thereto is stored in the host device.

10. The memory device according to claim 1, wherein the third key is a one-time password.

11. The memory device according to claim 1, wherein, upon receiving the first information from the host device, the controller allows the encryptor to encrypt the second key.

12. The memory device according to claim 1, wherein, after transmitting the encrypted second key and the third key, the controller transmits second information indicating that preparation for power supply shutdown is completed, to the host device, and in response to the second information indicating that preparation for power supply shutdown is completed, the power supply is turned off.

13. A method of controlling a memory device including a nonvolatile semiconductor memory, the method comprising:

storing a first key in a first memory being a nonvolatile memory;

storing a second key in a second memory being a volatile memory;

generating a third key based on a random number;

generating a fourth key based on the first key and the third key;

receiving user data sent from a host device;

encrypting the received user data with the second key;

storing the encrypted received user data in the nonvolatile semiconductor memory;

encrypting the second key with the fourth key;

receiving first information sent from the host device, the first information indicating that a power supply to the memory device is to be turned off; and transmitting the third key and the encrypted second key to the host device in response to the received first information.

14. The method according to claim 13, wherein the fourth key is generated based on the first key and the third key read from the host device, and the method further comprises decrypting the encrypted second key read from the host device based on the fourth key.

15. The method according to claim 14, wherein the encrypted second key read from the host device is decrypted when the power supply to the memory device is turned on.

16. The method according to claim 13, further comprising storing the third key in the semiconductor memory.

17. The method according to claim 16, further comprising comparing the third key read from the host device with the third key read from the semiconductor memory when the power supply to the memory device is turned on.

18. The method according to claim 13, further comprising:

generating a digital signature, attaching the digital signature to access information, encrypting the access information with the digital signature attached thereto, and transmitting the encrypted access information to the host device before the power supply to the memory device is turned off.

19. The method according to claim 13, wherein the third key is one-time password.

20. The method according to claim 13, further comprising:

transmitting second information indicating that preparation for power supply shutdown is completed, to the host device after transmitting the encrypted second key and the third key, by a controller, wherein the power supply is turned off in response to the second information indicating that preparation for power supply shutdown is completed.

* * * * *